(12) United States Patent
Gódor et al.

(10) Patent No.: US 11,190,409 B2
(45) Date of Patent: Nov. 30, 2021

(54) SYSTEM AND METHOD FOR RESOURCE-AWARE AND TIME-CRITICAL IOT FRAMEWORKS

(71) Applicant: Telefonaktiebolaget LM Ericsson (publ), Stockholm (SE)

(72) Inventors: István Gódor, Budapest (HU); Gabor Feher, Székesfehérvár (HU); Andras Balazs Lajtha, Budapest (HU); László Toka, Budapest (HU); Attila Vidacs, Budapest (HU)

(73) Assignee: Telefonaktiebolaget LM Ericsson (pub!), Stockholm (SE)

( * ) Notice: Subject to any disclaimer, the term of this patent is extended or adjusted under 35 U.S.C. 154(b) by 0 days.

(21) Appl. No.: 16/318,187

(22) PCT Filed: Dec. 29, 2016

(86) PCT No.: PCT/IB2016/058079
§ 371 (c)(1),
(2) Date: Jan. 16, 2019

(87) PCT Pub. No.: WO2018/020306
PCT Pub. Date: Feb. 1, 2018

(65) Prior Publication Data
US 2019/0288919 A1    Sep. 19, 2019

Related U.S. Application Data

(60) Provisional application No. 62/369,012, filed on Jul. 29, 2016.

(51) Int. Cl.
*H04L 12/24* (2006.01)
*H04L 12/911* (2013.01)
*H04L 29/08* (2006.01)

(52) U.S. Cl.
CPC ........ *H04L 41/147* (2013.01); *H04L 41/0823* (2013.01); *H04L 41/0889* (2013.01);
(Continued)

(58) Field of Classification Search
CPC ............... H04L 41/147; H04L 41/0823; H04L 41/0889; H04L 41/0896; H04L 47/827; H04L 67/12; H04L 47/70
(Continued)

(56) References Cited

U.S. PATENT DOCUMENTS

2012/0157106 A1\* 6/2012 Wang .................... H04W 24/08
455/446
2012/0197852 A1\* 8/2012 Dutta .................. H04L 67/2804
707/692
(Continued)

FOREIGN PATENT DOCUMENTS

EP       2073463 A1     6/2009
WO    2013123445 A1     8/2013
(Continued)

OTHER PUBLICATIONS

Toka, L. et al., "A resource-aware and time-critical IoT framework", IEEE International Conference on Computer Communications, May 1, 2017, pp. 1-10, IEEE.

*Primary Examiner* — Nicholas R Taylor
*Assistant Examiner* — Chong G Kim
(74) *Attorney, Agent, or Firm* — Coats + Bennett, PLLC (57) ABSTRACT

Methods and apparatus for resource optimization in Internet-of-Things (IoT) networks are presented. For instance, the disclosure presents an example method executed by a network node (106) in an IoT system (100). In some embodiments, the example method includes predicting (202) a likelihood that a future event will be detected by one or more IoT devices (102) in the IoT system (100) under different
(Continued)

potential resource allocation and IoT device settings. The predicting (202) is conducted subject to resource availability constraints in some examples. In addition, the example method includes, based on the predicting (202), adapting (204) at least one of resource allocation and IoT device settings in the IoT system (100) for the future time. This adapting (204) is conducted such that the likelihood that the future event will be detected is maximized under the resource availability constraints according to a target optimization function.

15 Claims, 6 Drawing Sheets

(52) U.S. Cl.
CPC ........ H04L 41/0896 (2013.01); H04L 47/827 (2013.01); H04L 67/12 (2013.01); *H04L 47/70* (2013.01)

(58) Field of Classification Search
USPC .......................................................... 709/226
See application file for complete search history.

(56) References Cited

U.S. PATENT DOCUMENTS

| | | | | |
|---|---|---|---|---|
| 2012/0197911 A1* | 8/2012 | Banka | ............. | H04L 67/12 707/752 |
| 2013/0128022 A1* | 5/2013 | Bose | ............. | A63F 13/213 348/77 |
| 2013/0282149 A1* | 10/2013 | Kuntagod | ............. | H04W 4/70 700/73 |
| 2013/0336091 A1* | 12/2013 | Song | ............. | G01V 1/288 367/38 |
| 2014/0016575 A1* | 1/2014 | El Gamal | ............. | H04W 16/00 370/329 |
| 2014/0184273 A1* | 7/2014 | Feizi-Khankandi | ............. | H03M 1/1265 327/91 |
| 2014/0357392 A1* | 12/2014 | Goel | ............. | A63B 53/00 473/223 |
| 2015/0244645 A1* | 8/2015 | Lindo | ............. | H04L 47/823 709/224 |
| 2015/0288573 A1 | 10/2015 | Baughman et al. | | |
| 2015/0324636 A1* | 11/2015 | Bentley | ............. | A63F 13/00 386/227 |
| 2016/0047679 A1* | 2/2016 | Jernigan | ............. | G01N 19/10 702/116 |
| 2016/0105308 A1* | 4/2016 | Dutt | ............. | G06N 3/0472 709/221 |
| 2016/0293133 A1* | 10/2016 | Dutt | ............. | G06F 8/20 |
| 2017/0006135 A1* | 1/2017 | Siebel | ............. | G06F 9/5072 |
| 2017/0308421 A1* | 10/2017 | Angeles | ............. | G06F 11/079 |
| 2017/0352102 A1* | 12/2017 | Vavrasek | ............. | G06N 7/005 |

FOREIGN PATENT DOCUMENTS

| | | |
|---|---|---|
| WO | 2016057885 A1 | 4/2016 |
| WO | 2016057887 A1 | 4/2016 |
| WO | 2016118979 A2 | 7/2016 |

\* cited by examiner

SYSTEM AND METHOD FOR RESOURCE-AWARE AND TIME-CRITICAL IOT FRAMEWORKS

RELATED APPLICATIONS

This application claims priority to U.S. Provisional patent Application Ser. No. 62/369,012, filed 29 Jul. 2016, the entire contents of which are incorporated herein by reference.

TECHNICAL FIELD

The application relates to systems, methods, and apparatus for resource awareness in time-critical Internet-of-Things (IoT) frameworks.

BACKGROUND

IoT is the vision of virtually all objects being connected to the internet, where the objects can be anything from simple sensors to sophisticated machinery such as vehicles. As a result of the increasing numbers of IoT devices that can populate an IoT system, current IoT systems can produce a plethora of data—so much, in fact, that existing IoT network devices sometimes have difficulty locating the computing and bandwidth resources to receive and process all of the produced data. One solution, the cloud computing model, has been successful in delivering computing as a service at an affordable price, with improved scalability and reliability. The inherent latency associated with cloud computing presents an engineering challenge, however, in time-critical use-cases, and even where resource allocation is dynamic. For instance, if a change in allocation must be made quickly, the changes are frequently not applied until after they are needed due to the relatively slow implementation of existing cloud-based resource allocation algorithms.

Therefore, improved techniques are needed for dynamic resource allocation in IoT network environments, including those implemented on the cloud.

SUMMARY

One or more embodiments herein allow for improved resource allocation in networks serving IoT devices. To effect such an improvement, a network node can receive data from different IoT devices and use the data to predict a likelihood of a particular future event occurring. Based on this determination, as well as the available system resources, the network node can alter parameters or settings associated with different IoT devices, which can include operating parameters/settings of the devices themselves (e.g., camera resolution, temperature sensor capture rate) or parameters/settings maintained by the network that involve each particular IoT device, a group of such devices, or all the devices under control of the network node (e.g., scheduled time/frequency resource allocation for the device(s), processing power (e.g., processor) allocations, memory, etc.)

Some embodiments, for example, include a method for resource optimization executed by a network node in an Internet-of-Things (IoT) system. The example method includes the network node predicting a likelihood that a future event will be detected by one or more IoT devices in the IoT system under different potential resource allocation and IoT device settings, subject to resource availability constraints. In addition, the example method includes based on the predicting, adapting at least one of resource allocation and IoT device settings in the IoT system for the future time such that the likelihood that the future event will be detected is maximized under the resource availability constraints according to a target optimization function.

Further embodiments include corresponding apparatus, computer programs, and computer program products.

DETAILED DESCRIPTION

The present disclosure describes example techniques for utilizing event prediction to optimize system performance and Quality of Experience (QoE) where the system has associated resource constraints. In particular, the embodiments aim to maximize a probability that a future event will be observed or captured by the IoT devices, given the resource constraints, in view of a predicted likelihood of an event occurring at a future time. In an aspect, the process improves resource efficiency by allowing the cloud to control the data-rate of data streams sent for from the IoT devices to the cloud. After receiving the data, the network nodes in the cloud predict the location and timing of possible future events that ideally will be observed, or "captured," by one or more IoT devices. Depending upon on resource constraints of the system and certain performance (i.e., QoE) benchmarks, the network nodes can select some of the IoT device data sources to remain functional and can select other IoT devices that are to be turned off or ordered to operate within a smaller bandwidth. In this way, resources important to capturing the event are allotted sufficient resources to do so relative to other devices that may be less critical to the event capture.

Figure 1:
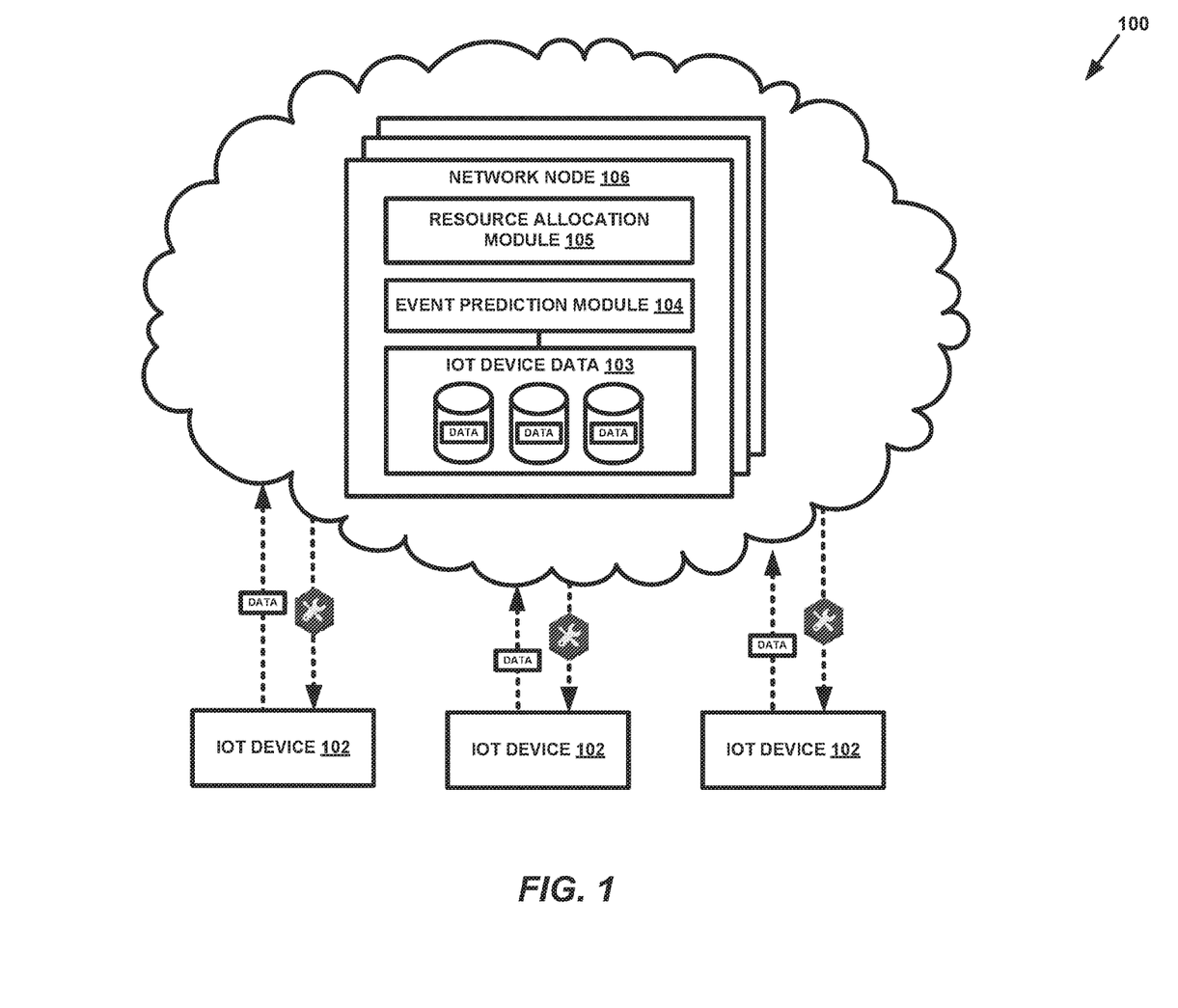
FIG. 1 illustrates an IoT system corresponding to example embodiments of the present invention.

FIG. 1 illustrates an example IoT communication system 100 ("IoT system," "system") that includes IoT devices 102 in communication with one or more network nodes 102, which together may operate as a cloud computing network. In such a cloud computing network configuration, the network nodes 102 may operate collaboratively, as each network node may utilize its own processing resources, memory, modules, etc. in conjunction with those of other network nodes to perform aspects of the present disclosure. This is illustrated in FIG. 1 by the stacked network nodes 106, indicating that although a single network node 106 may include each of the components and perform all of the aspects of the present embodiments attributed to a network node 106, in some examples a plurality of network nodes 106 may work in conjunction to do so. On other words, a network node 106 may represent a plurality of network node devices working in collaboration for purposes of the present disclosure. Therefore, in some embodiments, a separate network node 106 may perform one aspect of an embodiment and may contain an associated module for doing so, and different network node 106 may perform a separate aspect of the embodiment and may contain the associated module for performing that second aspect. As such, the term "network node" can be substituted for the term "network nodes" as used herein.

IoT devices 102 are configured to generate data 103 and transmit that data 103 to the network node 106. The data 103 may include any type of data, including data that the particular IoT device 102 is configured to generate, transmit, and/or otherwise output. For instance, the IoT device 102 may be a sensor, such as, but not limited to, a temperature sensor/thermostat, a camera, microphone, or any other device configured to communicate autonomously with one or more other wireless devices or network nodes. In some examples, the IoT devices 102 may be configured to generate data associated with a game, an athletic contest, or any other observable function. In the present disclosure, an example embodiment will be presented wherein a game of squash (racquet sport) is observed by one or more IoT devices 102 and serves as an example use-case where high ball speed requires functional operation on the network in time-sensitive situations. Thought this is one example use-case, it is not meant to be regarded in any way as limiting.

Once the network node 106 has received the data 103, the network node 106 may store the IoT device data 103 in a local memory (or in memory of another accessible device). Based on the data received from the IoT devices 102, an event prediction module 110 of network node 106 may predict a likelihood that an event will occur at a future time. In particular use cases, analysis of the the data 103 may indicate that a game action has occurred at a speed and/or in a direction. For instance, in the squash example, an IoT camera device may initially send data to the network node 106 that indicates a racquet is being swung at a certain speed and direction, and from that data, the event prediction module 110 can predict that the ball will hit a wall in the squash court (the wall contact being the predicted event) at a particular estimated time in the future.

Based on this event prediction by the event prediction module 104, a resource allocation module 106 can adapt resource allocation and IoT device settings in the IoT system for the future time such that the likelihood that the future event will be detected is maximized under the resource availability constraints according to a target optimization function. The resource allocation adaptation can be based on one or more of available radio spectrum of the system (i.e., uplink capacity for transmitting data 103 to the network (or "cloud")), which is usually a scarce resource from the IoT-device side; the particular IoT devices 102 present and the operational parameters/settings thereof (e.g., sample rate, image resolution and frame size in case of a camera, sampling rate and output value granularity in case of a temperature sensor, or other device-specific settings); the available or reserved computing power of the system, which greatly influences the precision of event detection; electrical energy, radio spectrum. Each of these aspects and constraints interplay in the resource allocation module 106 that can be implemented to consistently maximize QoE given the resource (and/or cost) constraints with a relatively high update frequency. In order to accomplish fast algorithms (e.g., dynamic programming) with discrete target optimization functions are proposed herein.

As shown in FIG. 1, after determining any adapted IoT device settings based on the target optimization function, the network node 106 can deliver any adapted settings (or all settings, regardless of changes, in some examples) to appropriate IoT devices 102. In addition, network-size parameters, such as bandwidth allocation, data flow QoS, allocated processing power, and the like can be implemented according to any resulting adaptation. Thus, based on the actual and forecasted performance requirements and resource constraints of the system, the resource allocation module 106, continuously optimizes the resource allocation by allocating an appropriate quantity and volume of underlying network resources (e.g., time and frequency resources, processing power, central processing units (CPUs)/graphics processing units (GPUs)/cores, memory, disk, etc.) and by controlling the granularity of sensor data 103 to be collected and uploaded by the IoT devices 102 for subsequent event prediction.

Figure 2:
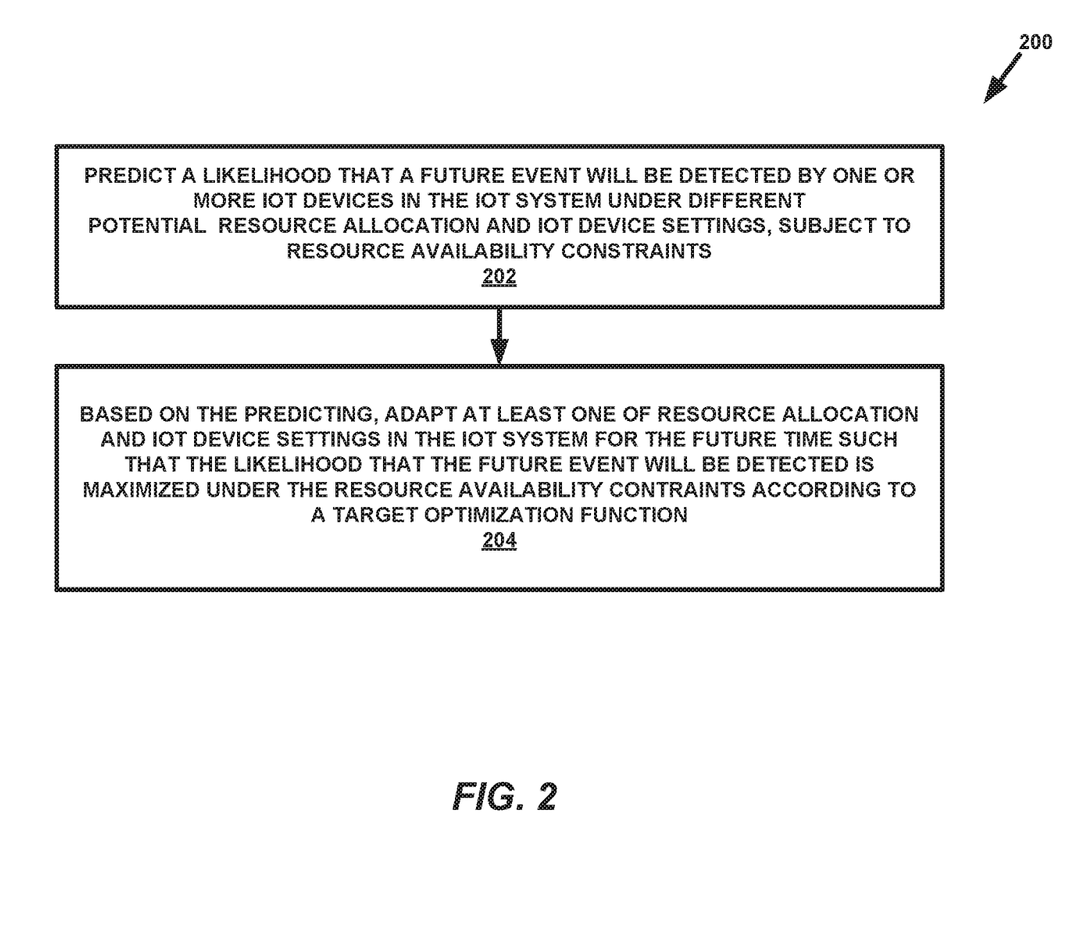
FIG. 2 illustrates a method performed by a network node according to one or more embodiments.

FIG. 2 illustrates an example method 200 performed by one or more network nodes 106 for optimizing IoT system performance under resource constraints. For instance, at block 202, the network node 106 (e.g., via event prediction module 104) can predict a likelihood that a future event will be detected by one or more IoT devices in the IoT system under different potential resource allocation and IoT device settings, subject to resource availability constraints.

In addition, based on this event prediction by the event prediction module 104, at block 204, the network node 106 (e.g., via the resource allocation module 106) can adapt resource allocation and IoT device settings in the IoT system for the future time such that the likelihood that the future event will be detected is maximized under the resource availability constraints according to a target optimization function. In an aspect, the network node 106 may perform this prediction and optimization on a periodic basis by dividing time into discrete periods (e.g., of 0.1 sec), and at the end of each period, the network node 106 (also referred to herein generally as "the cloud") can decide the data streams to be received in the next period, the resources to allocate, and/or IoT device settings to adjust. In other words, in some instances, network node 106 may be configured to adapt resource allocation and/or IoT device settings in the IoT system 100 for a future time during each of a plurality of consecutive time periods. As such, in the squash example, the cloud follows the game and intelligently selects the best camera positions for the next time period depending on the period of the game, the position of the players, and any object used in the game (e.g., the ball, a racquet, net, goal, or any other sport- or game-specific object required for or optional in game play).

In addition to the device settings, the network nodes 106 is configured to optimize network resource allocation by making fast decisions among the squash fields and data stream requests. To make these decisions, the event prediction module 104 estimates a utility function, which is the probability of not detecting or capturing an important event as a function of available resources, such as uplink bandwidth.

Figure 3:
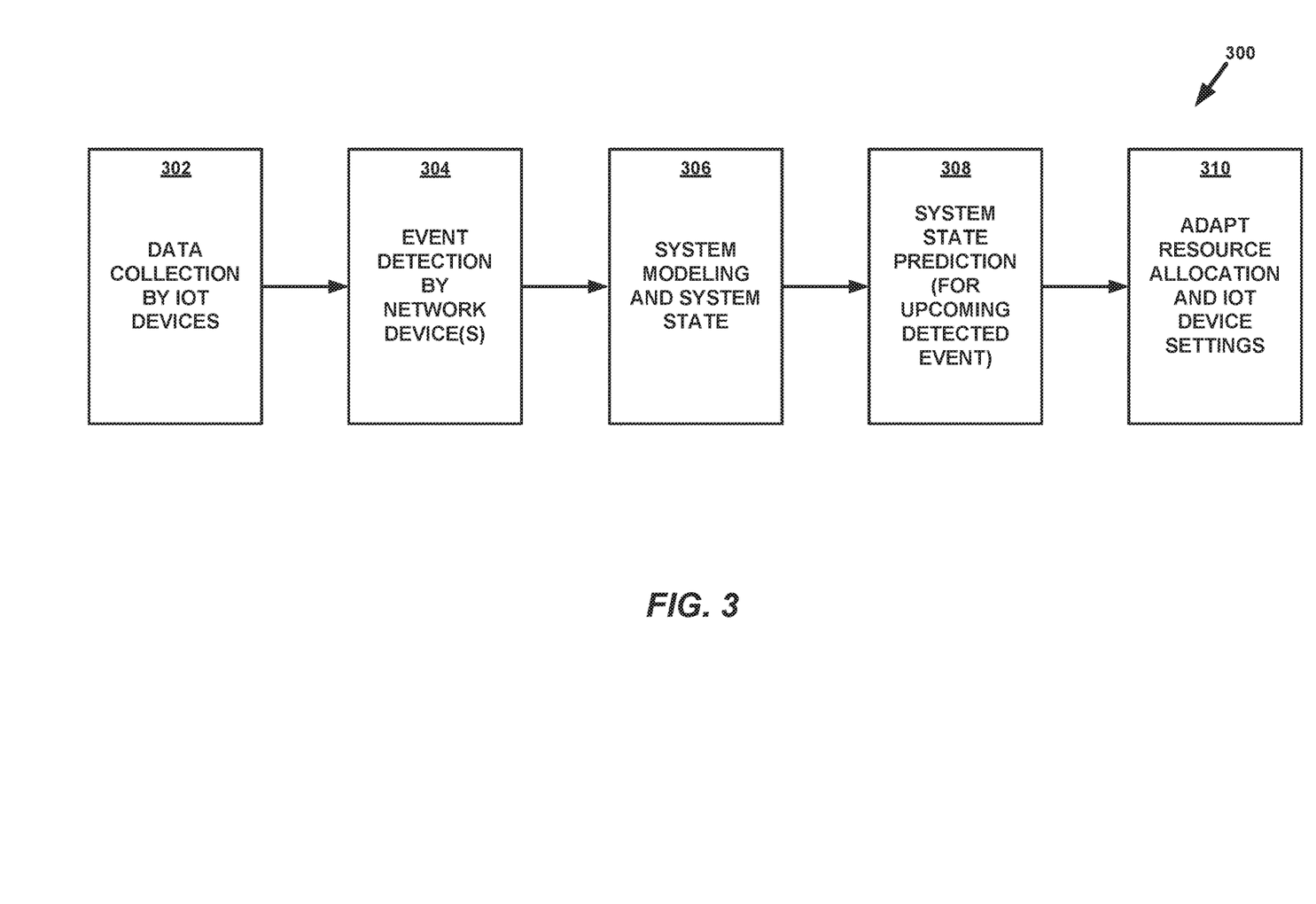
FIG. 3 illustrates further aspects of a method performed by a network node according to one or more embodiments.

Turning to FIG. 3, generation and aggregation of these utility functions, along with other example implementation details, will be described in terms of the flow chart of method 300, which is related to method 200. Returning to the squash example, for each game the network node 106 executes processes for detecting the future event or events. An event can be a player movement, a wall ball impact location a stroke, etc., and more generally, can be any event whatsoever when the present aspects are implemented out-side of the squash context. In general, the accuracy of event detection depends on the quality and quantity of the received data and cloud resources allocated.

Ideally, to perfectly analyze any game (or action, generally), all events would be captured. However, even if resources are infinite, an event miss may happen for many reasons. The present embodiments seek to minimize the number of missed events (or the price of missing events if prices to event miss are assigned). The detection algorithms can also run in reduced resource conditions, whereby the network node 106 determines that not all IoT devices 102 are to send data, or the camera picture is to be cropped or sent with a substantially lower resolution or frame rate. In such circumstances, as the video quality drops, the probability of missing detection of an event increases.

With this in mind, we turn to method 300, where, as introduced above, one or more IoT devices 102 collect or "capture" data 103 at block 302, send it to the network nodes 106. Upon receiving the data, the network node 106 performs event detection/prediction according to custom detection algorithms at block 304 and may alert the other components where such an event is detected or predicted. Blocks 302 and 304 can be performed periodically, for instance at a same time interval as computation of the utility function and adaptation of resources, or may be performed in a streaming or "always on" manner (non-periodic).

Moving to blocks 306, 308, and 310 of FIG. 3, these aspects show the steps in the resource allocation decisions that determine what type of and how much data should be collected at a given time, which resource allocation structures should be altered, as well as which IoT device settings should be changed. For instance, at block 306, the computed parameters are loaded in the predefined data model, and the current model state of the observed system is established. At block 308, based on the current state and the data model, at least one prediction is generated on the expected system state in the very near future (e.g. for the next time period/predicted event time). Finally, at block 310, based on the prediction, a target optimization function (for finding optimized resource allocation and IoT device settings) is executed, for example, by the resource allocation module 105, which sets the resources for the data gathering sensors, the uplink capacities and the detector, modeling and predictor cloud computing resources for the very near future (e.g. for the next time period/predicted event time).

Figure 4A:
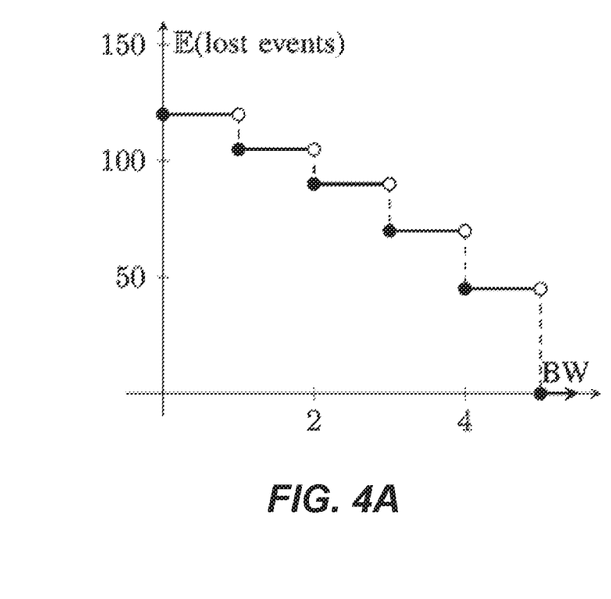
FIG. 4A illustrates a step function of an expected number of undetected/lost events in a next time period as a function of allocated bandwidth according to one or more embodiments.
Figure 4B:
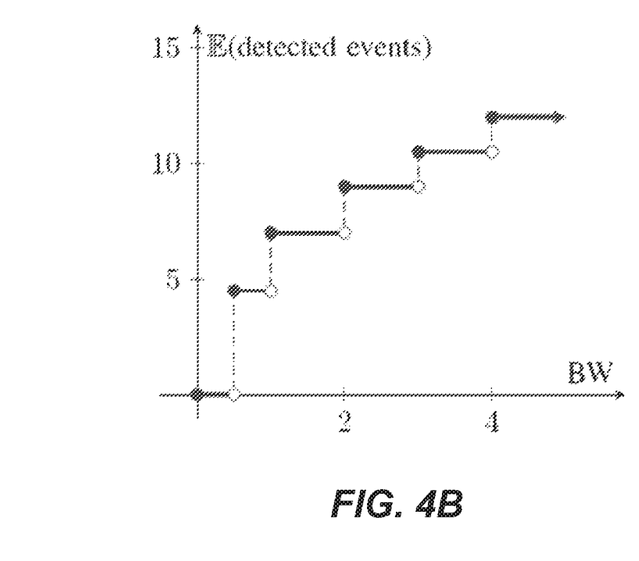
FIG. 4B illustrates a step function of an expected number of detected events in a next time period as a function of allocated bandwidth according to one or more embodiments.

As stated above, in some embodiments, time is divided into time frames, and at the end of each time frame the network node 106 computes the expected number, or probability thereof, of event misses in the next time frame depending on the amount of available system resources and/or IoT device settings. As shown in FIG. 4A, it is assumed that the expected number of missed events is a decreasing step-function of the resource to be allocated (bandwidth BW in FIG. 4A), because using more resources should not increase the miss rate. Conversely, as indicated in FIG. 4B, it is assumed that the expected number of detected events increases as a step function as more of the resource (BW) is allocated.

To determine an "optimal" configuration of resource allocation and/or IoT device settings, certain embodiments may use a "utility function," which is a general function that measures a characteristic of a system under certain conditions. By maximizing a utility function, the system therefore maximizes the property that the utility function represents. In the present invention, the network node 106 will aggregate utility functions for each "step" (e.g., in FIG. 4A) to obtain a combined utility function, which should be maximized in order to minimize the probability of losing an event. Again, one goal of the present disclosure, as reflected in a target optimization function, is to minimize the amount of events that are missed, such that either the expected total or average number of missed events across all sites is minimal, or that maximum number of missed events at any site is minimal. In terms of FIG. 3, and as described further below, at least blocks 306, 308, and 310 comprise the "optimization" of network resource allocation and IoT device settings, and as such, can be performed after each time interval.

The computed utility function represents the probability of detecting a next event, and is a multidimensional function of the available resources (such as uplink bandwidth, CPU cores, etc.) and IoT device settings. This highlights an interesting trade-off between bandwidth and available Central Processing Unit (CPU) resources: if more CPU but less bandwidth (resources) is present, low quality video images (less data) may be sent and more sophisticated detection algorithms may be executed. On the other hand if more bandwidth but less CPU is available, video of an entire squash court (or any other type of data) can be sent, making it sufficient to use the low-performance algorithm. Thus, when the resources are scarce, the following trade-off exists: should the network node 106 use a high-performance algorithm on less data, or the low-performance one on data about the whole front wall? All ball-related events on distinct courts are naturally independent, so aggregating the utility functions for these events is straightforward. The simplest case is to consider the total number of detected events, and to maximize the expected number of detections. In this case the utility for each time frame is the sum of the detection probabilities given the allocated resources.

A variant of this utility is to incorporate the possibility that distinct courts have different priorities when it comes to ball impact detection. For example, there might be a tournament on some of the courts while other ones have friendly games. In this case we can make favor some courts to others by assigning a weight to each court and taking a weighted sum of the detection probabilities.

Furthermore, it should be noted that a utility function for any implementation can be defined in multiple ways. For instance, the utility function in the squash problem could be defined as minimizing a number of missed events, but could likewise be defined as a QoE in the system. As a straightforward generalization of a utility function to me maximized, we consider multiple resources with a general utility function. Say we have m resources R1, R2, . . . , Rm. Apart from bandwidth restrictions we may have further constraints on i.e. the total number of cores we may allocate, or the total amount of CPU available for the courts. We can assume that the utility represents the Quality of Experience, thus our goal is to maximize it (or could choose in other examples event detection rate). In any event, we can allow $x_{ij}$ denote the amount of resource j we allocate to court i in a given time frame, let the set of allocations be $X=\{x_{ij}, i=1 \ldots, n, j=1, \ldots, m\}$, let f(X) be the gain in utility if we make these allocations, and let u(•) be the desired utility, the target allocation function, whose solution on is ultimately sought by the present can be formulated as follows:

$$\text{maximize } u(f(X)),$$

$$\text{subject to } \sum_{i=1}^{n} x_{ij} = R_i, \ j = 1, \ldots, m,$$

$$x_{ij} \geq 0, \ i = 1, \ldots, n, \ j = 1, \ldots, m.,$$

This example target allocation function indicates that the optimal resource allocation and/or IoT settings are those that result in the utility function being maximized when subject to resource constraints (e.g., where other bandwidths have already been allocated to other devices, for instance).

The above target allocation function serves as a valid high-level mathematical representation of optimizing resource allocation and/or IoT settings based on resource availability. In order to actually evaluate the target allocation function to obtain concrete results (i.e. specific IoT parameter values and resource allocation instructions) in different use-cases, however, the optimal utility function result and its associated settings and resource allocations must be identified through a series of processing steps. These processing steps, described below, involve several equations and algorithms that utilize the variable notation of Table 1:

TABLE 1

Notation Guide

| | |
|---|---|
| n | Number of courts |
| i | Current court, $i \in \{1, 2, \ldots, n\}$ |
| $s_i$ | Current state for court i |
| $x_i$ | Decision variable for court i |
| $x_n^*$ | Optimal value of $x_i$, given $s_i$ |
| $p_i(x_i)$ | The gain in performance if $x_i$ resources are allocated to court i |
| $f_i(s_i, x_i)$ | Contribution of the stages upward from i, assuming that the system starts at court i in state $s_i$, the amount of resource allocated at this court is $x_i$, and the optimal decisions are made afterward. |
| $f_i^*(s_i)$ | $f_i^*(s_i, x_1^*)$ |

The squash game example will again be utilized to illustrate the dynamic processing involved in identifying an optimal resource allocation. First let us describe the problem for n courts and B amount of allocatable bandwidth (BW). For every court we are given a list of detection probabilities $p_i(x)$, corresponding to the probability of detecting a ball impact on court i if the front wall image is dropped to x, where $x \in \{1/8, 2/8, 3/8, 4/8, 5/8, 8/8\}$. The goal is to maximize the expected number of detected ball-impacts, or equivalently, the aggregated detection probabilites. The problem can be represented mathematically as follows.

$$\text{maximize } \sum_{i=1}^{n} p_i(x_i),$$

$$\text{subject to } \sum_{i=1}^{n} x_i = B$$

$$x_i \geq 0, \ i = 1, \ldots, n$$

To define a dynamic program system states must first be identified. A state of the problem s=(s,r) consists of the court index $s \in \{1, \ldots, n\}$ and the amount of bandwidth r still available for allocation to courts s, s+1, . . . , n, where r is in the closed interval [0,B]. Note that while s must be an integer here, as it is a court index, there is no such restriction for r. The only such restriction is that for every court the number of different scenarios should be finite. Due to defining a state as how much BW remains (i.e., is able to be allocated), the network node moves through the states backwards. For instance, the network node can start at court n, without knowing how much bandwidth has already been allocated, thus the initial state set is I={(n,r): r=0, 1, . . . , B}. The state s=0 represents the final state, when every court is assigned a bandwidth and no more decisions are to be made. The state space S is the set of feasible states, which is represented as:

$$S = F \cup \{s : 1 \leq s \leq n, 0 \leq r \leq B\}$$

The actual number of states depends on the number of possible values for r. Furthermore, as each possible system state and its required resources (e.g., bandwidth) can depend on certain IoT device settings (i.e., video frame rate, camera resolution, etc.), the state space can be said to represent all possible resource allocation and IoT device setting permutations given the resource availability constraints of a given system.

A decision d(s)=d is the amount of bandwidth allocated to court s. A feasible decision is made if the available resources are not exceeded, that is, the feasible decision set is:

$$D(s) = \{d : d(s) + r \leq B\}$$

The transition function s'=T(s,d) determines the next state, which now is s'=s−1, r'=r−d. According to an aspect, a network node moves through the states of the dynamic program driven by the recursive equations detailed below.

The value $f_b(s,d)$ of a state is the gain over all previous states assuming that court s is a current court, there is b amount of bandwidth left to assign to the remaining courts, and d bandwidth to this court. The optimal decision $f_b^*(s,d)$ can be computed by solving the following recursive equations, in an aspect of the present disclosure. By solving these recursive equations, the network node 106 can determine whether a probability of detecting the future event could be increased, relative to a probability of detecting the future event under a current state, by adapting at least one of resource allocation and IoT device settings. Furthermore, if the network node 106 makes a determination that the probability of detecting the future event could be increased, the network node 106 can utilize the recursive equations to identify an "optimal decision," which corresponds to a state of the state space that maximizes the probability of detecting the future event under the resource availability constraints. For instance, for the final stage of analysis, this optimal decision can be represented as:

$$f_b^*(n, d) = \max_{\substack{0 \leq x \leq B-d \\ 0 \leq d \leq B}} p_n(x)$$

For the internal stages (i.e., not the final stage/state), optimal decisions are driven by the following equation:

$$f_b^*(s_i, d_i) = \max_{x_i = 0, 1, \ldots, s_i} \{p_i(x_i) + f_{b_i - x_{i+1}}^*(s_i - 1, x_i)\}.$$

for $i = 1, 2, \ldots, n-1$.

Because the network node moves backward through stages, the final value obtained will be $f_b^*(1,d)$, which gives the maximum expected number of events that are able to be detected. The decision d here is the optimal decision at the first stage, $x_1^*$. For all of the other stages, the optimal choice $x_1^*$ is the x that maximizes $$f_{B-\sum_{j=1}^{i-1} x_j^*}(i, x).$$

This solution can be described broadly for multiple resources with a general utility function. For instance, consider a situation where m resources are available: $R_1$, $R_2$, . . . , $R_m$. As with the examples presented above, apart from bandwidth restrictions, other restrictions on the system may exist, such as a total number of processors or cores that are available for allocation in the system or the total amount of processing power (e.g., processors, Central Processing Units (CPUs)) available at a particular location (e.g., at each squash court). In the example embodiments presented herein, one goal of the system is to maximize the Quality of Experience (QoE) of the system users. As such, the general utility function may represent QoE (the pertinent utility), and to improve QoE, a network node of the system may be configured to maximize the utility function.

To do so, let us denote an amount of resource j to be allocated to a court/in a given time frame, and the set of allocations to be $X=\{x_{ij}, i=1, n, j=1, \ldots, m\}$. In addition, f(X) represents the gain if the allocations for the set X, and u(•) represents the desired utility. Accordingly, the problem of maximizing the utility function in a general scenario can be formulated as follows:

$$\text{maximize} \sum_{i=1}^{n} p_i(x_i),$$

$$\text{subject to} \sum_{i=1}^{n} x_i = B$$

$$x_i \geq 0, i = 1, \ldots, n$$

In addition, a set of possible states must be defined for a general formulation. A state $s=(s, r_1, r_2, \ldots, r_m)$ represents the amount $r_j$ of resource $R_j$, $j=1, \ldots ,m$ that has already been allocated to previous sites (e.g., squash courts, etc.) when a particular site is considered. An initial state set is represented as $I=\{(n, r_1, r_2, \ldots, r_m)\}: r_j=0, 1, \ldots, B_j, j=1, \ldots, m$, and the final state is represented as $F=(0, B_1, B_2, \ldots, B_m)$, with the entire state space being represented as $S=F\cup\{s:1\leq s\leq n, 0\leq r_i\leq B_i, i=1, \ldots, m\}$.

In this general representation of the solution, the recursive equations to be solved (e.g., by a network node 106) to arrive upon an optimal decision are as follows:

For the final stage:

$$f^*_{b_1,b_2,\ldots,b_m}(n, d_i, d_2, \ldots, d_m) = u(f(\{x_{nj}\})) \max_{\substack{0\leq x_i\leq B-b_i \\ 0\leq d_i\leq B_i}} \{p_n(x_i)\}.$$

For the other ("internal") states:

$$f^*_{b_1,b_2,\ldots,b_m}(s_i, d_i) = \max_{x_i=0,1,\ldots,s_i} \{p_i(x_i) + f^*_{i+1}(s_i - x_i)\},$$

$$i = 1, 2, \ldots, n-1$$

Therefore, when these equations are recursively solved for each available state in the set of states, optimal values for utility can be determined and implemented to maximize the QoE for the system's users across a plurality of sites (e.g., squash courts).

Figure 5:
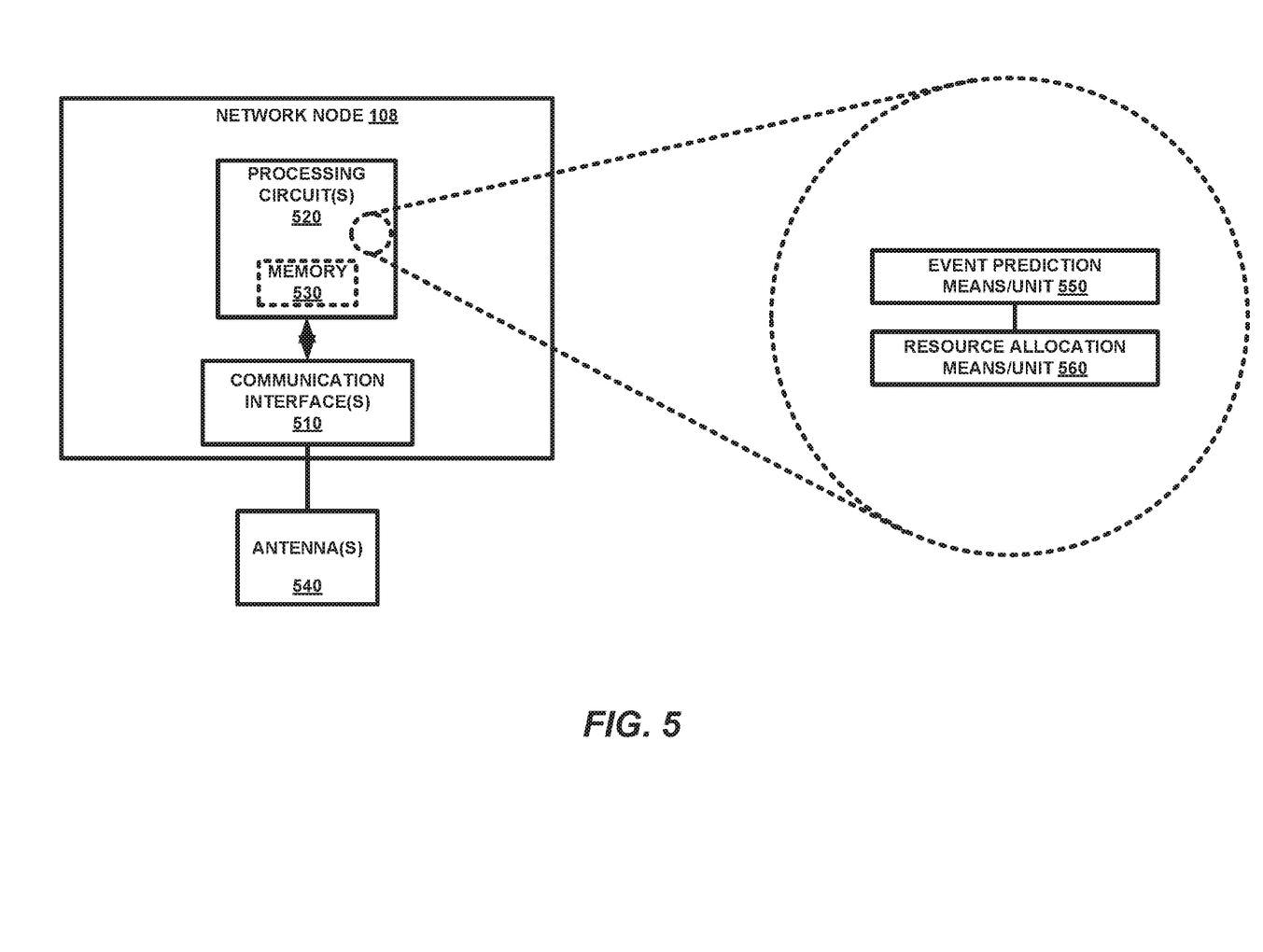
FIG. 5 illustrates aspects of an example network node in example embodiments of the present invention.

FIG. 5 illustrates additional details of an example network node 106 of an IoT system according to one or more embodiments. The network node 106 is configured, e.g., via functional means or units (also may be referred to as modules or components herein), to implement processing to perform certain aspects described above in reference to at least FIGS. 1-3. The network node 106 in some embodiments for example includes an event prediction means or unit 550 for prediction of events based on data received by one or more IoT devices (may correspond to event prediction module 104 of FIG. 1), and a resource allocation means or unit for allocating network resources and configuring IoT device settings (may correspond to resource allocation module 105 of FIG. 1). These and potentially other functional means or units (not shown) together perform the aspects of method 300 presented in FIG. 3 and/or features described in FIGS. 5-10 as being related to the network node 106.

In at least some embodiments, the network node 106 comprises one or more processing circuits 520 configured to implement processing of the method 200 of FIG. 2 and certain associated processing of the features described in relation to FIGS. 5-10, such as by implementing functional means or units above. In one embodiment, for example, the processing circuit(s) 520 implements functional means or units as respective circuits. The circuits in this regard may comprise circuits dedicated to performing certain functional processing and/or one or more microprocessors in conjunction with memory 530. In embodiments that employ memory 530, which may comprise one or several types of memory such as read-only memory (ROM), random-access memory, cache memory, flash memory devices, optical storage devices, etc., the memory 530 stores program code that, when executed by the one or more for carrying out one or more microprocessors, carries out the techniques described herein.

In one or more embodiments, the network node 106 also comprises one or more communication interfaces 510. The one or more communication interfaces 510 include various components (e.g., antennas 540) for sending and receiving data and control signals. More particularly, the interface(s) 510 include a transmitter that is configured to use known signal processing techniques, typically according to one or more standards, and is configured to condition a signal for transmission (e.g., over the air via one or more antennas 540). Similarly, the interface(s) include a receiver that is configured to convert signals received (e.g., via the antenna(s) 540) into digital samples for processing by the one or more processing circuits. In an aspect, the obtaining module or unit 550 may comprise or may be in communication with the transmitter and/or receiver. The transmitter and/or receiver may also include one or more antennas 540.

Figure 6:
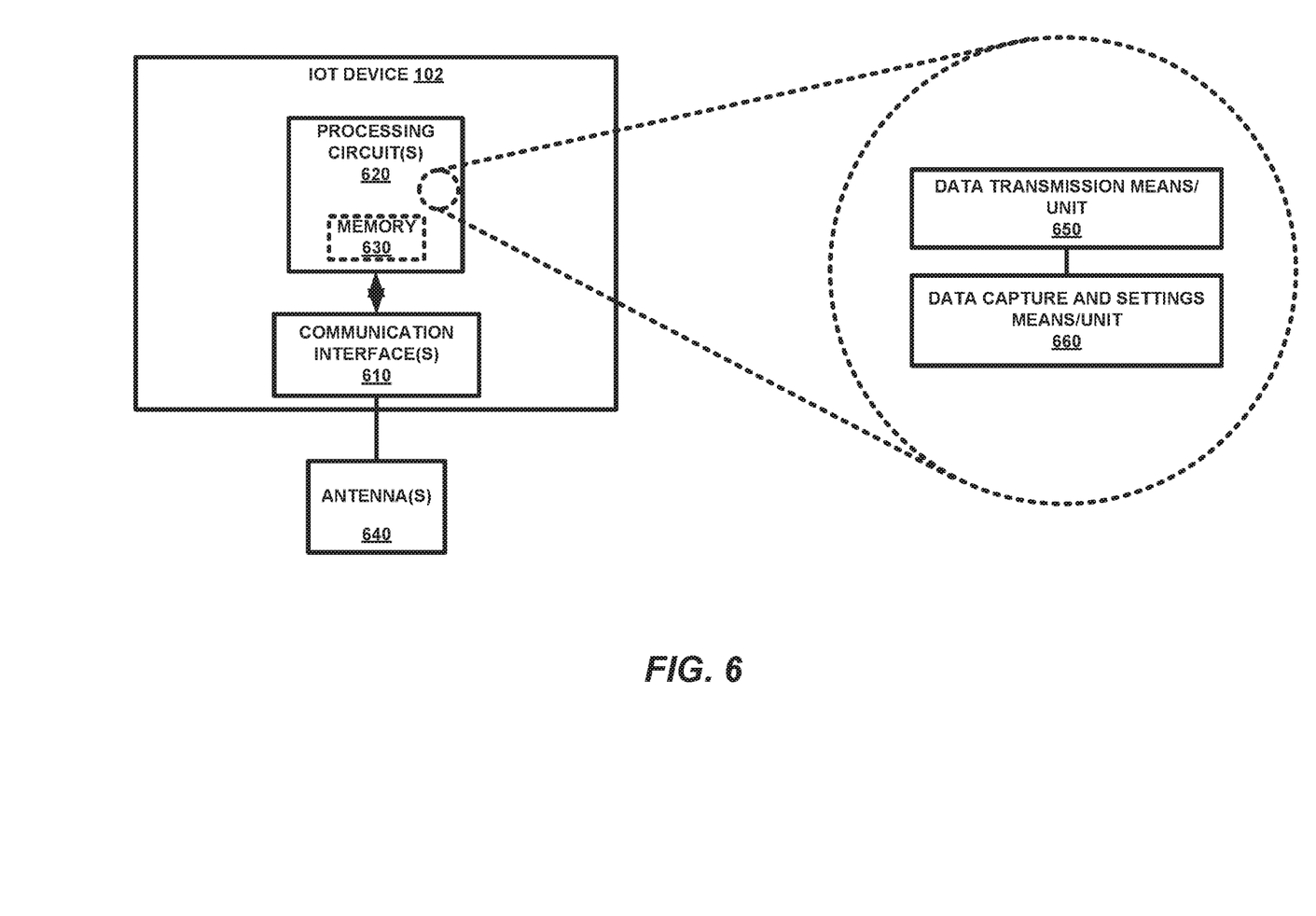
FIG. 6 illustrates aspects of an example IoT device in example embodiments of the present invention.

FIG. 6 illustrates additional details of an example IoT device 102 according to one or more embodiments. The IoT device 102 is configured, e.g., via functional means or units (also may be referred to as modules or components herein), to implement processing to perform certain aspects described above in reference to FIGS. 3 and 5-10. The IoT device 102 in some embodiments for example includes a data transmission means or unit 550 for transmitting captured data to a network node 106, and a data capture and setting means or unit for capturing data according to one or more settings, such as updating settings values according to commands received from a network node 106. These and potentially other functional means or units (not shown) together perform the IoT features described in FIGS. 1-3 as being related to the IoT device 102.

In at least some embodiments, the IoT device 102 comprises one or more processing circuits 620 configured to implement processing of the method 200 of FIG. 3 and certain associated processing of the features described in relation to FIGS. 4-6, such as by implementing functional means or units above. In one embodiment, for example, the processing circuit(s) 620 implements functional means or units as respective circuits. The circuits in this regard may comprise circuits dedicated to performing certain functional processing and/or one or more microprocessors in conjunction with memory 630. In embodiments that employ memory 630, which may comprise one or several types of memory such as read-only memory (ROM), random-access memory, cache memory, flash memory devices, optical storage devices, etc., the memory 630 stores program code that, when executed by the one or more for carrying out one or more microprocessors, carries out the techniques described herein.

In one or more embodiments, the IoT device 102 also comprises one or more communication interfaces 610. The one or more communication interfaces 610 include various components (e.g., antennas 640) for sending and receiving data and control signals. More particularly, the interface(s) 610 include a transmitter that is configured to use known signal processing techniques, typically according to one or more standards, and is configured to condition a signal for transmission (e.g., over the air via one or more antennas 640). In an aspect, the revealing module or unit 660 may comprise or may be in communication with the transmitter. Similarly, the interface(s) include a receiver that is configured to convert signals received (e.g., via the antenna(s) 640) into digital samples for processing by the one or more processing circuits. The transmitter and/or receiver may also include one or more antennas 1340.

Those skilled in the art will also appreciate that embodiments herein further include corresponding computer programs. A computer program comprises instructions which, when executed on at least one processor of the network node 106, network node 106, or IoT device 102 cause these devices to carry out any of the respective processing described above. Furthermore, the processing or functionality of network node 106 or network node 106 may be considered as being performed by a single instance or device or may be divided across a plurality of instances of network node 106 or network node 106 that may be present in a given network or wireless communication system such that together the device instances perform all disclosed functionality. In addition, network nodes 106 and/or 108 may be any known type of device associated with a network or wireless communication system that is known to perform a given disclosed process or function. Examples of such network nodes include eNBs, Mobility Management Entities (MMEs), gateways, servers, and the like.

Embodiments further include a carrier containing such a computer program. This carrier may comprise one of an electronic signal, optical signal, radio signal, or computer readable storage medium. A computer program in this regard may comprise one or more code modules corresponding to the means or units described above.

A radio network node 10 herein is any type of network node (e.g., a base station) capable of communicating with another node over radio signals. IoT device 102 is any type device capable of communicating with a radio network node 10 over radio signals, such as, but not limited to, a device capable of performing autonomous wireless communication with one or more other devices, including a machine-to-machine (M2M) device, a machine-type communications (MTC) device, a user equipment (UE) (however it should be noted that the UE does not necessarily have a "user" in the sense of an individual person owning and/or operating the device). An IoT device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), Universal Serial Bus (USB) dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IoT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method for resource optimization, the method comprising a network node in an Internet-of-Things (IoT) system:
    predicting a likelihood that a future event will be detected by one or more IoT devices in the IoT system under different potential resource allocation and IoT device settings, subject to resource availability constraints, wherein the predicting comprises evaluating a plurality of utility functions, each representing a probability of capturing the event at a future time under a different given resource allocation and IoT device configuration; and
    adapting, based on the predicting, at least one of resource allocation and IoT device settings in the IoT system for the future time such that the likelihood that the future event will be detected is maximized under the resource availability constraints according to a target optimization function.

2. The method of claim 1, wherein the predicting the likelihood comprises evaluating the plurality of utility functions each representing a probability of not capturing the event at the future time under the different given resource allocation and IoT device configuration.

3. The method of claim 1, further comprising:
receiving data captured by one or more IoT devices in the IoT system; and
predicting a likelihood that the future event will occur based on the received data.

4. The method of claim 1, wherein the adapting comprises maximizing an overall probability of detection of the future event for the IoT system.

5. The method of claim 1, wherein the adapting comprises determining a state space comprising all possible resource allocation and IoT device setting permutations given the resource availability constraints.

6. The method of claim 1, wherein the adapting comprises solving one or more recursive equations to determine whether a probability of detecting the future event could be increased, relative to a probability of detecting the future event under a current state, by adapting at least one of resource allocation and IoT device settings.

7. The method of claim 5, wherein the adapting comprises setting resource allocation and device settings in line with a state of the state space that maximizes the probability of detecting the future event under the resource availability constraints.

8. The method of claim 1, wherein the adapting is performed during each of a plurality of consecutive time periods.

9. The method of claim 1, wherein the resource availability constraints comprise at least one of: electrical energy, radio spectrum, uplink capacity, computing power, memory, storage capacity, time, and cost.

10. The method of claim 1, wherein the IoT device settings comprise at least one of: whether to send data in the uplink, camera resolution, frame size, sample frequency, direction of view, resolution of captured data, and data frame rate.

11. The method of claim 1, wherein the network node comprises a plurality of network devices working in collaboration.

12. The method of claim 1, wherein the IoT system comprises a cloud computing system.

13. The method of claim 1, wherein the predicting comprises:
receiving data indicating that at least one of a game action has occurred at a speed and in a direction; and
predicting whether the future event will occur at a particular future time based on the received data.

14. The method of claim 1, further comprising selecting a best camera position for a next time period in a game depending on at least one of: a particular period of the game, a position of one or more players, and a position of one or more objects utilized in the game.

15. A network node in an Internet-of-Things (IoT) system, the network node comprising:
processing circuitry;
memory containing instructions executable by the processing circuitry whereby the network node is operative to:
predict a likelihood that a future event will be detected by one or more IoT devices in the IoT system under different potential resource allocation and IoT device settings, subject to resource availability constraints, wherein to predict the likelihood, the network node is operative to evaluate a plurality of utility functions, each representing a probability of capturing the event at a future time under a different given resource allocation and IoT device configuration; and
adapt, based on the predicting, at least one of resource allocation and IoT device settings in the IoT system for the future time such that the likelihood that the future event will be detected is maximized under the resource availability constraints according to a target optimization function.

* * * * *

UNITED STATES PATENT AND TRADEMARK OFFICE
CERTIFICATE OF CORRECTION

PATENT NO. : 11,190,409 B2
APPLICATION NO. : 16/318187
DATED : November 30, 2021
INVENTOR(S) : Gódor et al.

It is certified that error appears in the above-identified patent and that said Letters Patent is hereby corrected as shown below:

On the Title Page

Item (73), under "Assignee", in Column 1, Lines 1-2, delete "Telefonaktiebolaget LM Ericsson (pub!)," and insert -- Telefonaktiebolaget LM Ericsson (publ), --, therefor.

In the Specification

In Column 3, Line 27, delete "Thought" and insert -- Though --, therefor.

In Column 6, Line 51, delete "to me" and insert -- to be --, therefor.

In Column 9, Lines 6-7, delete "$f_{B-\sum_{j=1}^{i} 1 x_j^*}(i, x).$" and insert -- $f_{B-\sum_{j=1}^{i=1} x_j^*}(i, x).$ --, therefor.

In Column 9, Line 25, delete "court/in" and insert -- court i in --, therefor.

In Column 9, Line 47, delete "F=(0, $B_1$, $B_2$, . . . , $B_m$)," and insert -- F=(0, $B_1$, B-2, . . . , $B_m$), --, therefor.

In Column 12, Line 15, delete "table computers," and insert -- tablet computers, --, therefor.

In Column 12, Line 16, delete "equipped" and insert -- equipment --, therefor.

Signed and Sealed this
Tenth Day of May, 2022

Katherine Kelly Vidal
*Director of the United States Patent and Trademark Office*